Jan. 17, 1939.  A. T. MACE  2,144,411

PUMP

Filed Dec. 24, 1936

INVENTOR.
Arthur T. Mace
BY Pray, Oberlin & Pray
ATTORNEYS.

Patented Jan. 17, 1939

2,144,411

UNITED STATES PATENT OFFICE 2,144,411

PUMP

Arthur T. Mace, East Cleveland, Ohio, assignor to The Radiart Corporation, East Cleveland, Ohio, a corporation of Ohio Application December 24, 1936, Serial No. 117,482

5 Claims. (Cl. 103—2)

This invention relates to an improved pump designed to facilitate the use of hot water heaters in automobiles. The device may, however, be employed wherever a pump is needed employing two outlets, through both of which a given amount of fluid is to be pumped.

Hot water heaters in automobiles have been used for several years and have heretofore been attended with certain disadvantages. Hot water heaters ordinarily depend for their operation on the heat units given off by the radiator cooling fluid circulated through the heater and since these heaters are not of variable capacity their heating efficiency varies with the speed of the vehicle. It thus follows that when the vehicle is traveling at a comparatively low rate of speed, as in the usual city traffic, the amount of liquid pumped through the device per unit time is much less than in country driving at high speeds. Thus much less heat is radiated in city driving than in country travel. The result is that in city driving in cold weather an automobile has often been cold and uncomfortable.

Automobiles as delivered generally have a thermostat to control the circulation of liquid through the engine and which stays closed at the time of starting until the engine block is thoroughly warmed.

In one make of automobile for instance, this thermostat ordinarily opens at 140° F. and continues to stay open because the motor normally operates at approximately 165° F. When a heater is installed in this system the liquid fed thereto does not exceed the operating temperature of 165°, and because of low pump capacity the amount of liquid circulated is not sufficient to radiate the required number of heat units to the interior of the car.

Since not enough liquid at this temperature flows through the heater, thermostats have been substituted for those furnished with the car to maintain the engine at a temperature of approximately 180° F. in order that enough heat units may be delivered to the heater at low liquid flow. Such an installation has many disadvantages. The chief of these is that the radiator is designed to cool the liquid in the cooling system to maintain the engine temperature at approximately 165°, and raising the operating temperature of the motor above that at which it is designed to run is harmful and frequently results in cracked heads and other damage.

The cardinal object of my invention therefore has been to provide a circulation system for a car heater which operates in conjunction with the motor cooling system and acts to supply the requisite amount of heat units to the heater for radiation to the car interior, and at the same time permits the engine to be operated at the temperature for which it is designed.

A further object has been to accomplish this by the use of an improved liquid pump for circulating the liquid to the engine and to the heater in proper proportion to cause satisfactory operation of both at all speeds.

An additional object of my invention has been to design a pump with an impeller unit and an associated orifice for feeding liquid from the impeller, past the orifice to the radiator at a predetermined rate in such manner that a proper distribution is effected with respect to the percentage of liquid circulated through the engine and the percentage circulated through the heater.

It has been a further object of my invention to provide mechanism for accomplishing the aforementioned result which is compact and which occupies very little room and may be substituted for the ordinary water pump supplied with the vehicle. In this connection it is necessary to incorporate minor changes of design to adapt the unit for different vehicles and, as will be apparent hereinafter, this may be done without departing from the spirit of my invention.

Referring now to the drawing:—

Figure 1:
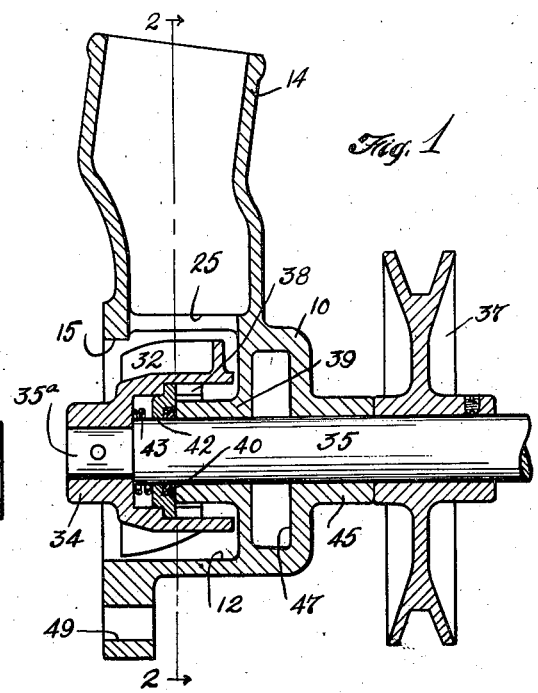
Fig. 1 is a vertical lengthwise section through my improved type of pump.
Figure 3:
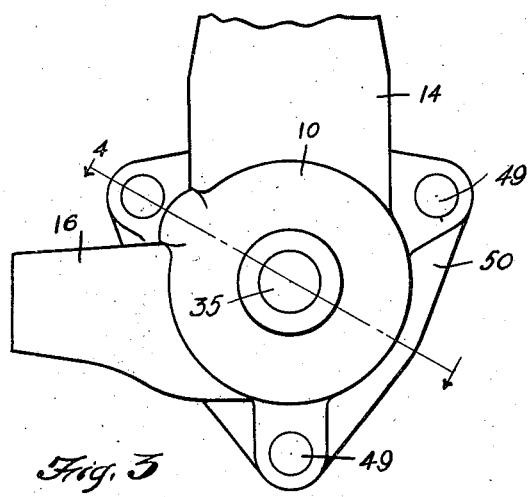
Fig. 3 is a fragmentary end elevation of the device of Fig. 1 with the driving pulley removed.
Figure 4:
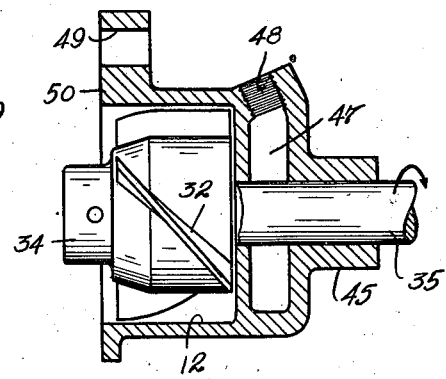
Fig. 4 is a section through the device as indicated by the line 4—4 of Fig. 3.

The pump is provided with a close-grained cast iron body 10, which is shown in Fig. 1 as a roughly cylindrical central chamber 12 in which the vaned impeller rotates. Extending upwardly from the chamber 12 is a tubular outlet extension 14 which, at its upper end, is shaped to provide a fitting for a radiator hose connection and which acts as the outlet for the pump. The inlet is at the left-hand end of the chamber 12, as shown in Fig. 1, comprising a large central opening 15 which acts to deliver cooling liquid to the pump impeller. The pump shown is adapted for use on a V-type engine.

Figure 2:
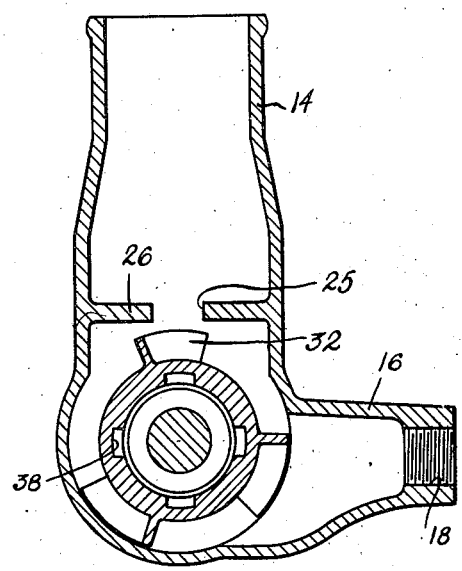
Fig. 2 is a section at right angles to Fig. 1, as indicated by the lines 2—2 thereon.

The outlet from the pump to the heater extends radially of the impeller axis and approximately 90° from the outlet pipe 14. As shown in Fig. 2 this comprises a lateral extension 16 terminating in a threaded portion 18 in which the ordinary type of heater fitting may be threaded.

The impeller rotates in a counter-clockwise direction in this figure. The extension 16 there shown has a curved bottom portion leading from the threaded portion 18 and entering the pump chamber at the bottom substantially tangentially to the periphery of the impeller vanes later to be described. It will thus be seen that liquid forced from the vanes to the heater may be thrown off tangentially or at the point of greatest velocity. This has been found important in securing the requisite flow to the heater for satisfactory operation of the same.

The outlet pipe 14 as heretofore indicated is provided with an orifice for limiting the amount of liquid fed to the radiator to the amount supplied by the pump designed and furnished with the car, as the total output of my pump is many times the capacity of the original cam pump. For the pump shown it may be stated, as a guide to adapting my invention for other uses, that I have found an orifice approximately rectangular in shape which is 1¼ inches long and ½ inch wide to be satisfactory. The orifice 25 is formed by a pair of inwardly extending projections 26 in the body 10, as shown in Fig. 2. The projections 26 lie close to the periphery of the revolving impeller unit and extend inwardly from the side of the pipe 14 to provide sharply angular pockets on each side of the orifice and between the projections 26 and the impeller.

For the best results in operation of both the motor cooling system and the car heating system it has been found that the proportional cross-sectional area between the orifice 25 and the heater outlet 18 should be between three and five to one. The preferred ratio is three and three-fourths to one, in which the orifice 25 is the larger area. This ratio is necessary in order to insure a proper distribution of the motor fluid to the engine block and the car heater. If the orifice 25 is too large in proportion to the heater outlet the latter will be starved and the car will run cold. Reverse conditions result in the engine running too hot. An important part of my invention has been in determining the desired ratio to be employed.

A turbulent action is set up adjacent the orifice due to these pockets which prevents the free flow of liquid through the orifice. As the speed of the impeller increases, the turbulence increases. The result is that at high speeds the amount of liquid pumped to the radiator is in proper proportion to the speed. Thus the engine may be cooled at high speeds without pumping so much water through the system that it backs up in the radiator core and passes out the overflow pipe.

The outlet pipe with which this size of orifice has been used will be seen from the drawing to be roughly rectangular in cross-section adjacent the pump chamber and having the long dimension substantially equal to the diameter of the impeller unit and a short dimension substantially equal to the length of the unit. For purpose of comparison of the size of orifice mentioned above, the aforesaid long dimension in the pump herein described is approximately 1⅞ inches in length and the short dimension approximately 1¼ inches in length, the same being used with a pump chamber about 2¼ inches in diameter.

An impeller 30 comprising a hollow cylindrical shell carries the impeller vanes 32. These vanes, of which there are three, are equidistantly spaced from the periphery of the impeller and at an angle of approximately 50° to the central impeller axis. The cylindrical portion of the impeller 30 terminates at the end in a hub 34 which, as shown in Fig. 1, is keyed to a reduced diameter portion 35a of the shaft 35. Outside of the pump casing is a pulley 37, also fixedly carried by the shaft 35 which, when driven by a V-belt, operates the pump.

Pump packing between the shaft 35 and the exterior of the pump is provided. As shown in Fig. 2, a plurality of slots 38 are placed on the inside of the impeller 30 and extend axially thereof. A packing seal 40 rides on the shaft 35 and bears against a hub 39 of the pump casing 10. A second packing seal member 42 lies behind the seal 40 and occupies the recesses 38, insuring its rotation with the impeller. The seals are urged together and against the hub 39 by a suitable spring 43, which at its other end presses against a radial face of the impeller, thus effectively sealing the pump where the shaft rides in the hub 39.

The shaft 35 as heretofore mentioned, is carried in the journal 39 which cooperates with an outwardly projecting hub 45 to further support the shaft and provide an abutment for the pulley 37 to prevent axial movement of the rotating parts. A chamber 47 is positioned between these two hubs and may be filled through an opening 48 with grease to lubricate the shaft. The pulley is belt driven from the engine and its speed controlled thereby.

The entire unit is carried by the motor block and is secured thereto by suitable screws passing through the holes 49 in the flange 50 adjacent the pump inlet 15.

In operation, due to the unique construction of the pump, at the time the engine is started and operated at a comparatively slow rate, a large amount of liquid is circulated to the heater and a normal amount to the engine, sufficient not only to cool the latter but to adequately heat the interior of the car. The curved bottom of the outlet 16, entering the chamber tangentially to the impeller periphery, insures a constant and smooth flow of liquid to the heater. The orifice 25, on the other hand, limits the amount of liquid fed to the motor to aid in warming the same to operating temperature although at all times a sufficient quantity is fed to adequately cool the engine. As the engine speed is increased the amount of liquid fed to the heater continues to thoroughly warm the car, while the amount fed to the radiator cools the car without pumping such an excess of water that much of it backs up at the radiator core and goes out the overflow pipe. The rate of flow to the radiator is effectively controlled by the orifice 25 in connection with the angular pockets on the impeller side of the same.

Figure 5:
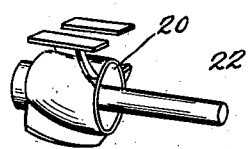
Fig. 5 is a perspective showing the impeller in combination with the baffle plates or flow equalizers.

It will be seen from the foregoing description that I have provided a novel automobile pump unit having a main and an auxiliary discharge opening and that, as shown in Fig. 5, I have provided an impeller and orifice construction which causes the pump to effectively cool the engine and at the same time heat the interior of the car at all times through the medium of the heater.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:—

1. In a device of the class described, a substantially cylindrical pump chamber, a vaned impeller rotatably carried in said chamber, an inlet to said chamber and a pair of outlets from said chamber both extending radially of the impeller axis, one of said outlets providing a connection to a heat radiating device, the other of said outlets leading to apparatus to be cooled, said cooling outlet merging with the pump chamber in a portion having cross-sectional dimensions substantially equal to the axial length of an impeller vane and the diameter of the impeller unit, a pair of plates extending inwardly from the sides of said cooling outlet to provide a rectangular orifice therein with the long dimension substantially equal to the axial length of an impeller vane and a width substantially less than the diameter of the impeller, said projections being flat on the side facing the impeller and merging with the outlet wall at substantially right angles thereto to provide angular pockets on each side of the orifice and adjacent the path of the vanes.

2. A pump for circulating cooling fluid through an automobile engine and automobile heater comprising a substantially cylindrical pump chamber, an inlet to said chamber and a pair of outlets from said chamber, one of said outlets providing a heater connection, the other of said outlets providing a motor connection, a vaned impeller rotatably carried in said chamber, said motor outlet leading from the chamber in a portion having a long dimension substantially equal to the diameter of the impeller and a short dimension substantially equal to the length of the impeller, projections extending inwardly from said motor outlet and adjacent the path of the outer edge of the rotating vanes to provide a rectangular orifice having a long dimension equal to the short or axially extending dimension of the motor outlet, and a short dimension of approximately one-fourth of the long or crosswire dimension of the motor outlet, said projections being flat on the side facing the impeller and merging with the outlet walls at substantially right angles thereto to provide angular pockets on each side of the orifice and adjacent the path of the vanes, said outlet then leading upwardly past the orifice and terminating in a radiator hose connection portion.

3. In a device of the class described, a pump chamber, a rotatable fluid pressure creating element in said chamber, an inlet opening to said chamber, a first outlet opening from said chamber extending radially of the impeller axis and a second outlet opening also extending radially of the impeller axis having a cross-sectional area defined substantially by the length of the impeller and the diameter thereof, and a portion of restricted cross-section in said second outlet adjacent the impeller unit of such size that the ratio between its cross-sectional area and the cross-sectional area of the first outlet is between three to one and five to one.

4. In a device of the class described, a pump chamber, a rotatable fluid pressure creating element in said chamber, an inlet opening to said chamber, a first outlet opening from said chamber extending radially of the impeller axis and a second outlet opening also extending radially of the impeller and having a cross-sectional area defined substantially by the length of the impeller and the diameter thereof, and a portion of restricted cross-section in said second outlet adjacent the impeller unit of such size that the ratio between its cross-sectional area and the cross-sectional area of the first outlet is approximately three and three quarters to one.

5. A pump for circulating cooling fluid through an automobile engine and automobile heater comprising a substantially cylindrical pump chamber, an inlet to said chamber and a pair of outlets from such chamber, one of said outlets providing a heater connection and merging with the chamber at a point substantially tangential to the bottom of the chamber wall, the other of said outlets providing a motor connection, an impeller rotatably carried in said chamber, a plurality of vanes carried by said impeller at an angle to a plane through the impeller axis in excess of 30°, said motor outlet leading from the chamber in a portion having a substantially uniform diameter, and projections extending inwardly from said motor outlet and adjacent the path of the outer edge of the rotating vanes to provide an orifice, said projections being flat on the side facing the impeller and merging with the outlet wall at substantially right angles thereto to provide angular pockets on each side of the orifice and adjacent the path of the vanes.

ARTHUR T. MACE.